(12) United States Patent
Powell (10) Patent No.: US 6,195,590 B1
(45) Date of Patent: Feb. 27, 2001

(54) SYSTEM FOR CONTROL AND RESOURCE ALLOCATION FOR THE MANUFACTURE OF A PRODUCT

(76) Inventor: Roger A. Powell, 1740 Hollins Rd., Bensalem, PA (US) 19020

( * ) Notice: Subject to any disclaimer, the term of this patent is extended or adjusted under 35 U.S.C. 154(b) by 0 days.

(21) Appl. No.: 09/022,251

(22) Filed: Feb. 11, 1998

(51) Int. Cl.[7] .................................................. G05B 13/02
(52) U.S. Cl. ............................. 700/36; 700/97; 700/99; 700/100; 700/102; 700/109; 700/108; 705/8; 705/29; 709/102; 709/106
(58) Field of Search ............................. 700/36, 97, 99, 700/100, 101, 102, 104, 108; 708/8, 29; 709/106, 102

(56) References Cited

U.S. PATENT DOCUMENTS

| | | | |
|---|---|---|---|
| 4,089,056 | * | 5/1978 | Barna et al. ........................ 700/108 |
| 4,208,712 | * | 6/1980 | Deustch ................................ 700/97 |
| 4,517,637 | * | 5/1985 | Cassell ................................... 700/2 |
| 4,648,023 | * | 3/1987 | Powell ................................. 700/36 |
| 4,796,194 | * | 1/1989 | Atherton .............................. 700/99 |
| 4,827,423 | * | 5/1989 | Beasley et al. ...................... 700/97 |
| 4,912,624 | * | 3/1990 | Harth et al. .......................... 700/36 |
| 5,105,362 | * | 4/1992 | Kotani ................................ 700/108 |
| 5,128,860 | * | 7/1992 | Chapman ........................... 700/108 |
| 5,241,465 | * | 8/1993 | Oba et al. ........................... 700/100 |
| 5,249,120 | * | 9/1993 | Foley et al. ........................ 700/108 |
| 5,291,397 | * | 3/1994 | Powell ................................ 700/108 |

* cited by examiner

Primary Examiner—Paul P. Gordon
Assistant Examiner—Ramesh Patel (57) ABSTRACT

A control system for the manufacture of a product. A network of activities is created in a primary computer and a baseline schedule is determined. The baseline schedule dates are transmitted to a plurality of secondary computers. The secondary computers monitor external elements used in the activities and predict constraints using delta values. Delta values are a direct estimate of the impact on the final completion date. This allows potential effects to be evaluated in parallel. Resources are redistributed based on the delta values to minimize time and cost.

29 Claims, 4 Drawing Sheets

000
SYSTEM FOR CONTROL AND RESOURCE ALLOCATION FOR THE MANUFACTURE OF A PRODUCT

BACKGROUND

This invention is directed to a control system for the manufacture of a product. The control system of this invention has the capability of rapid information processing and decision-making, minimizing production cycle time, efficiently allocating resources, and minimizing excess costs.

In the production of products, the work effort is a sequence of operations. The proper control of these operations is as important to the efficient transformation of the product from its initial state into its finished state as the individual operations themselves. Just as an improvement in each operation can improve the production rate, an improvement in the control of the production process can produce a similar reduction in total cost and the elapsed time of production. In the production of any product, the costs of idle waiting time, penalties of late deliveries, unjustified expediting costs, and the costs of excess inventories must be minimized. One system that has addressed this problem is the Critical Path Method(CPM), in which a network of activities is created that represents the sequence of operations and the interdependencies of the operations in the particular production process. A variation on this basic method is Project Evaluation and Review Technique (PERT) which uses multiple estimates of time durations to provide a probabilistic estimate. These systems are available as computer software. To use these systems, the networks are analyzed to find the critical path, i.e., the path that is, in effect, the longest duration, and which determines the final completion date.

A major problem of these systems is that new information must be evaluated by serial searching; each new bit of information must be entered and the program run to determine the effect on the completion date. The is a considerable expense in time and money on a large project. Also, near critical items are not identified. Further, all the information must be entered into one large computer program thereby requiring centralized processing and decision making. Although valuable, these systems do not provide an easy and timely visibility into the critical items and their degree of impact. Also, these systems do not offer a means to balance resources in order to minimize the time and cost of a project. These systems do not support Enterprise-Wide Project Management(EWPM) because the centralized decision making makes them intractable and they offer no methodology for optimization.

U.S. Pat. Nos. 4,648,023 and 5,291,397 describe a new method of centralized analysis and control using a central computer. U.S. Pat. Nos. 4,648,023 and 5,291,397 are incorporated by reference. This method described in these patents does not incorporate the advantage of decentralizing the analysis and decision-making to the local level to empower the local manager. Since the local manger is the expert in utilizing his resources, it would be advantageous to provide him with the tools and information to optimize the use of these resources.

OBJECTS OF THE INVENTION

One object of this invention is to provide a computer-network-based control system for manufacturing a product that provides a means for minimizing communication to a few easily understood descriptors and decentralizing the analysis and decision making to the local level. Another object is to allow searching the manufacturing process in parallel for critical items. Another object is to provide information for real time responses to inquires about the impact of changes in the availability of an item at the local level. Another object is to provide a means to monitor the progress of a manufacturing sequence of operations. Another object is to provide a control system that provides the basis for optimal distribution of resources within projects and across projects at the local level. Another object is to identify conflicts in the resource usage at the local level. Further objects and advantages will by apparent upon reading the following description in conjunction with the drawings.

SUMMARY OF THE INVENTION

The control system is composed of a primary computer of the project manager and a number of secondary computers linked in a computer network. This project manager on his primary computer establishes a network of manufacturing activities, assigns time durations estimates to each activity, and establishes baseline schedule dates for the beginning and end of each activity. This baseline schedule date data set is used as a constant reference against which all supporting external components availabilities and actual and predicted internal progress is measured. This information is transferred to the secondary computers via the computer network. The principal control variable is a measure of the projected or actual deviation from the baseline schedule data set and is called the delta or delta value. The delta value for each element and activity is calculated by the secondary computers and transmitted to the primary computer via the computer network. The delta value is used to determine the predicted final completion date, allocate resources, and optimally organize work in a queue. The use of delta values allows the parallel processing of information.

A BRIEF DESCRIPTION OF THE DRAWINGS

FIG. 2 shows a connection diagram of the control system showing the project manager's central primary computer and four secondary local computers each of which belongs to an activity manager interconnected by computer network cabling or the like.

DETAILED DESCRIPTION OF THE PREFERRED EMBODIMENT

To facilitate the description of the invention, it is worthwhile to define some conventions solely for this purpose. These conventions are somewhat arbitrary and should not be construed as limiting to the generality of the invention. For the purpose of this description:

A. Time is measured in working days.

B. Each working day is assigned a sequential number called the "date" representing the working calendar date or a point in time: the number increases with later calendar time.

C. The delta value or delta is the amount of time that a component or an activity in the network is early or late with respect to its baseline schedule date or requirement date. Algebraically, the delta value is the estimated availability date(or actual date) minus the requirement date. If the availability date is earlier than the requirement date, it will be numerically smaller that the requirement date, and the delta value will be a negative number. This indicates the potential for an early (or ahead of schedule) event. If the availability date is later than the requirement date, the delta value is positive, which predicts that the event will be late. The delta value is a measure of the amount of lateness of an element or an event with respect to its baseline schedule date; the greater the delta value, the grater the amount of lateness.

D. Greater delta value is defined in the algebraic sense, meaning the most positive amount i.e., positive 4(+4) is greater than negative 6(−6).

E. The predicted date for an event or element availability is the baseline schedule date plus the delta value. For example, if the baseline schedule date for an event is day 201 and the current delta value is +5, the predicted date is day 201 plus 5 days equal to day 206, or 5 days late.

Figure 1:
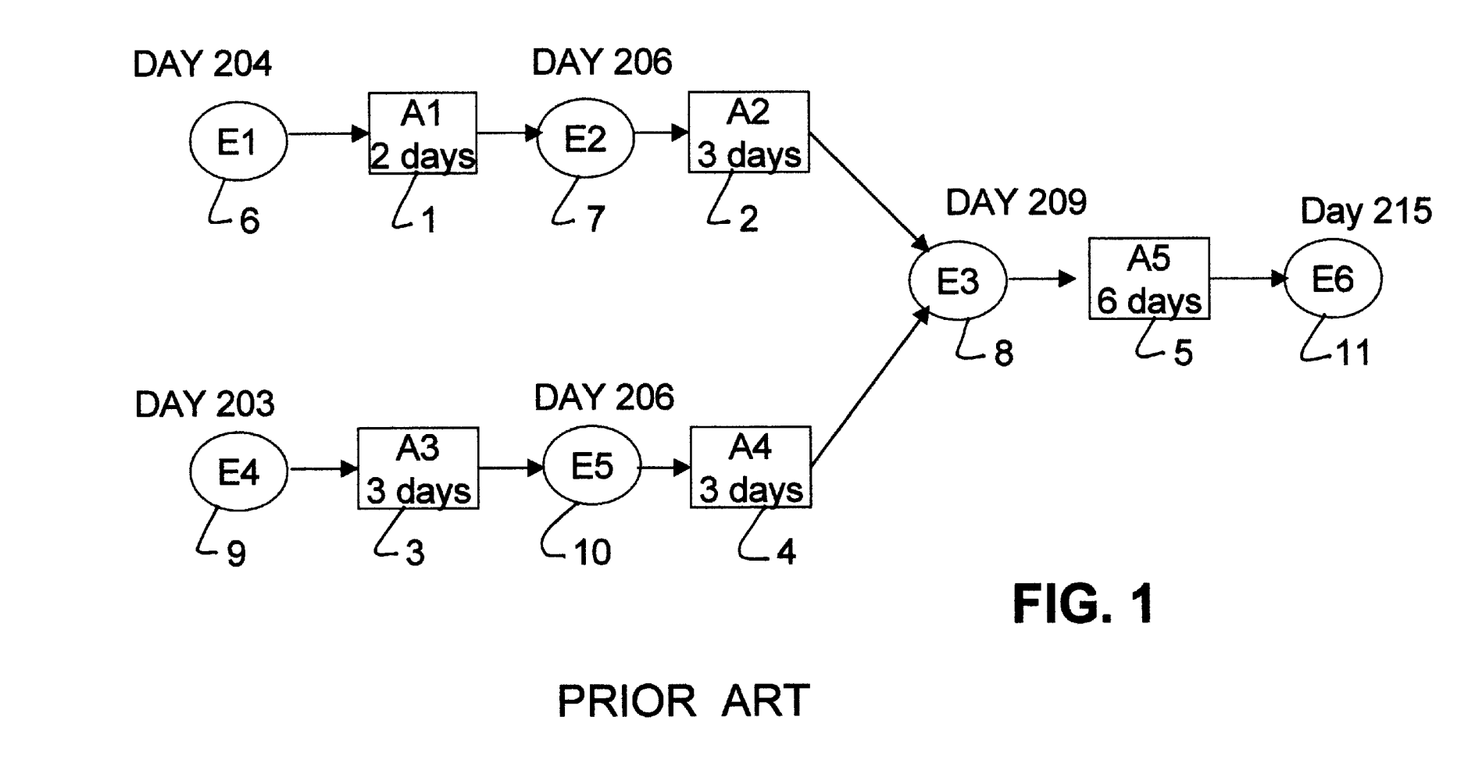
FIG. 1 shows a typical network of events and activities that describes the sequence of steps and interdependencies in the manufacture of a product.

In FIG. 1, in the manufacturing process of a product, the time-consuming transformation operations may be defined as activities, 1, 2, 3, 4, 5 and each one is identified by the letter "A" and a numerical suffix; i.e., "A1," "A2," etc. At the beginning and the end of each activity, 1, 2, 3, 4, 5, there exists a state or condition that occurs at a moment of time and which is defined as an event, 6, 7, 8, 9, 10, 11; for example: "Activity A1 completed, Activity A2 ready to begin" is event E2, 7. Events 6, 7, 8, 9, 10, 11 are identified by the letter "E" and a numerical suffix: for example: "E1," "E2," etc. Typically, there are interdependencies of the time sequence of activities in the manufacturing process. For example, holes must be drilled and tapped in a part before bolts can be screwed in, or, activity A1 must be completed before activity A2 can begin. This may be listing in a matrix or other format or it may be shown graphically as an interconnected network of activities.

FIG. 1 shows a network of activities 1, 2, 3, 4, 5 and events 6, 7, 8, 9, 10, 11 flowing from left to right. The interconnecting arrows show the direction of time and material flow, and flowing from left to right, and the interdependencies between the activities 1, 2, 3, 4, 5 and the event's 6, 7, 8, 9, 10, 11. For example, activity A5, 5 cannot begin until event E3, 8, has occurred, which is "Activity A2 complete, Activity A4 complete, Activity A5 ready to begin." Within each activity block 1, 2, 3, 4, 5, is shown the estimated time duration of the activity. The estimate includes waiting in queue, machine time, and time to transport the work piece to the next workstation. The foregoing parallels the Critical Path Method (CPM) of network analysis except that CPM requires that the beginning events in each path be connected together in a singe node. A CPM network must be generated to include all of the activities (including engineering, purchasing, fabrication and assembly, etc.) for all the components required in the complete product. This can result in a very large network. As will be seen later, this invention can reduce the size and complexity of the network of activities significantly.

The next step is the assignment of baseline schedule dates to each event. The desired final completion date is assigned to the final completion event E6, 11 in FIG. 1. In this example, "day 215" is used. The prior events are assigned their dates by moving from right to left (backward with respect to time) and subtracting the time duration estimate of the intervening activity from the date of the event that follows that activity in time. For example, the date for E3, eight equals the date for E6, 11, minus the duration of A5, 5, i.e., day 215 minus 6 days equals day 209. The resulting dates shown in FIG. 1 are the baseline schedule dates. The activities, their time sequence interdependencies, estimated durations and the desired completion date are entered into a primary computer as input by the project manager. The primary computer 20 may be a simple desktop personal computer or the like that are well known in the art. The primary computer 20 calculates the baseline schedule dates based on prior instructions. The baseline schedule date for the start of an activity is calculated by subtracting the duration of the activity from the baseline schedule date for the start of the following activity, beginning with the desired completion date. The resulting network of activities and a list of the events and their baseline schedule date are stored in the primary computer 20 and communicated to the secondary computers 21 via the computer network. The secondary computers 21 may be simple desktop personal computers.

The network of activities shown in FIG. 1 has no slack (or waiting) time embedded in the time flow. This is by design and is a major difference with the critical Path Method (CPM). Any event that occurs later than its baseline schedule date will cause the final completion date to be equally late. Similarly, any forecast of an event being late with respect to the baseline schedule dates (having a positive delta value) is also a direct forecast of the lateness of the final completion date. This feature allows multiple changes or effects to be evaluated in parallel rather than sequentially as in CPM. The event with the greatest delta value will dominate all other events and determine the effect on the final completion date.

Figure 2:
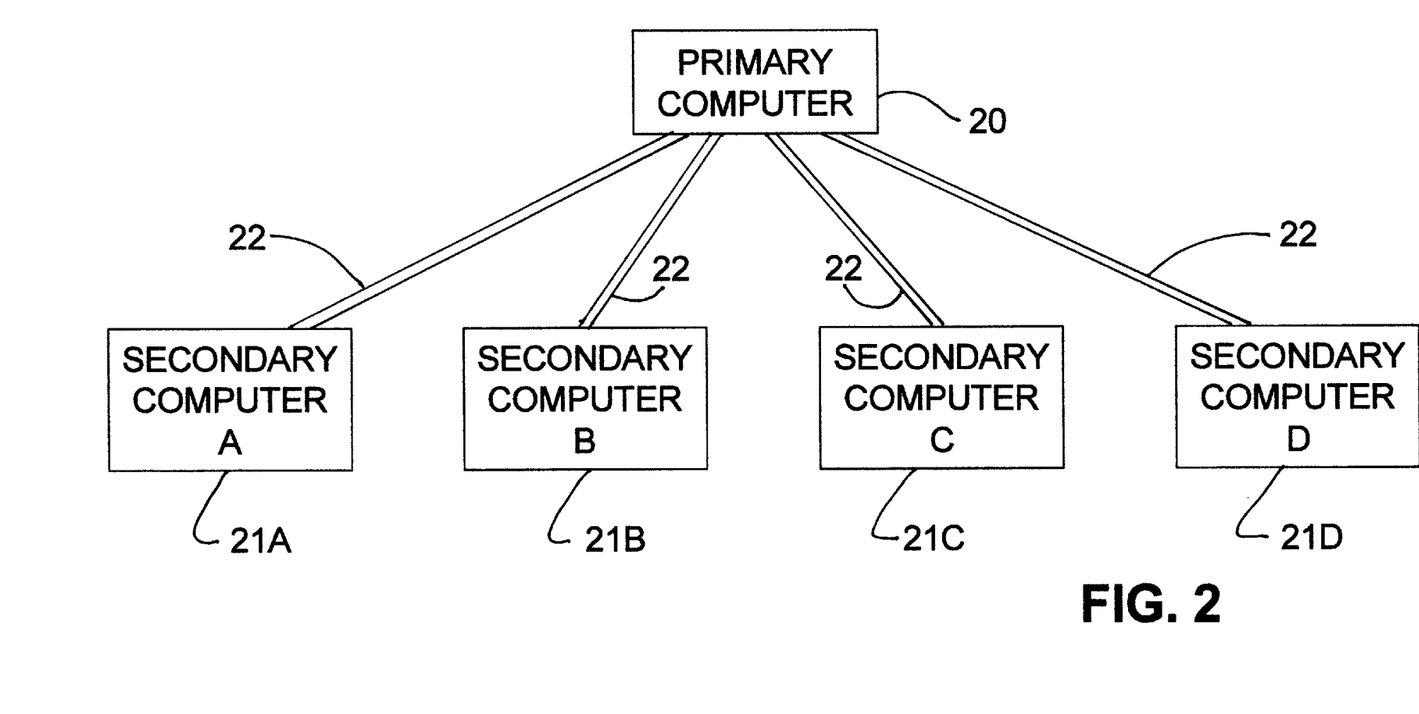

FIG. 2 shows an embodiment of the computer network used in the control system. The primary computer 20 is assigned to the project manager. It communicates with a number of secondary computers 21A, 21B, 21C, 21D which are assigned to the various activity managers. The computers are interconnected by the computer network that consists of cabling or the like 22 that interconnects the computers with one another. The cabling may be coaxial, fiber optic, or other means of digital communication and may include other hardware components such as network hubs or the like that are well known in the art. Communication over the network may be controlled by software within the primary and secondary computers and/or by a separate computer server. The computer network could be confined to one building or could be global by communicating over the Internet. The interconnection cabling shown is descriptive and arbitrary and should not be construed as limiting.

At this point is beneficial to describe the control system in two parts: the first part being the control of the external elements and the second part being the control of the internal operations. An external element is defined as an item that is required for an activity that has not yet entered the network and is not being tracked internally as part of the network flow. An external element may be a component or a fastener that is assembled during the activity or a tool such as an assembly fixture that is only used during the activity, then put aside. As will be seen later, the ability to track external element s separately from the network reduces the network size significantly.

An activity manager is appointed for each activity. The activity manager can typically be the functional manager responsible for the activity area. The activity manager is assigned a secondary computer. The activity manager identifies all of the external elements that are required to begin the activity. In this example, these are given five digit code numbers and are entered and listed in the activity manager's secondary computer 21 for activity A2, as shown in Table 1, column 1. The starting event for activity A2 is E2 as shown in column 2. Column 3 shows the baseline schedule date for the beginning event, in this case, event E2, 7 for activitys, A2, 2. The activity manager collects information on the availability date for each external element and enters it in column 4. His computer calculates the delta value for each line item and shows it in column 5. Table 1 is example of a display of information as might be seen on the screen of the secondary computer. The external element that is the la test (having the largest delta value) will be the external constraint on the beginning of the activity. The beginning of the activity can also be constrained by the completion of the upstream activity A1, 1. But, this invention allows the constraints on activity A1, 1 to be evaluated independently. Before a project actually starts, there are no upstream constraints, and only the external elements are evaluated. In this case, shown in Table 1, the activity manager identifies element 91005 as the latest element with the largest delta value of +2. This is the dominant external element. The other elements with lessor delta values must wait after arriving until element 91005 arrives and the activity can start. The activity manager must improve the availability date of element 91005 in order to improve the activity start date. He can investigate whither resources can be diverted from the lessor delta value elements to element 91005 to improve its date. For example, if resources can be diverted from element 91009 (to give it a three-day later availability date of 204 and a new delta of −2) to element 91005 to change its availability date to 206 and reduce its delta to zero, this removes element 91005 as the activity constraint. The change to element 91009 has no effect since it continues to be dominated or overshadowed by element 91005. He can also question whether element 91005 is absolutely necessary at the beginning of the activity. If it is not, he can revise the requirement date to be later and recalculate the delta value. For example, if element 91005 wasn't necessary until the second day of the activity, he could revise the requirement date to 207 and the delta value would be recalculated to +1. Now, since element 91005 and element 91001 both have delta values of +1, both must be improved to gain further improvement in the start date.

Assume for this example that there are no ready opportunities to improve the availability of element 91005 and the start date of activity A2 is constrained to day 208 or a delta of +2. The activity manager reports to the project manager's primary computer 20 via the computer network that the delta value for activity A2 is +2 days. If an activity manager wishes to develop more detail for an external element, he may construct a subnetwork for it. In essence, the CEM allows seamless branching in the case of external elements. An external element can have its own subnetwork with a completion date (delivery date) equal to its baseline schedule date (or requirement date) and its delta value in the subnetwork is equal to its value in the project.

The project manager collects the input activity delta values from each activity manager's secondary computer 21 over the computer network in his primary computer 20 and this information is arranged in a list as shown in Table 2. Table 2 is an example of the display of information as might be shown on the screen of the primary computer 20. The first column shows the activities. The second column shows the beginning event for each activity. The third column shows the baseline schedule dates for each event. The fourth column shows the reported delta value for each activity received from the activity managers. The project manager then scans the delta values to find the largest entry. In this example, it is activity A2 with a delta value of +2. This is the dominant activity that will determine the final completion date. Since there is no embedded waiting time (or slack time) in the baseline schedule, there is a one-to-one relationship between the dominate activity and its prediction of the final completion date. Since the dominate activity has a delta of +2 (2 days late), it predicts that the final completion date will be two days late. This activity must be improved by 2 days to satisfy the desired completion date.

The project manager can scan the delta values of Table 2 as displayed on his primary computer and see the critical activity, the next critical activity, etc. He has a clear view of which activity's external elements must be improved to improve the final completion date from its present prediction. With this knowledge, he can contact the critical and near critical activity managers via the computer network, to request more information on their external element constraints. He needs only to be concerned with the critical and near critical activities. The activities that have significantly negative delta values will be dominated by those with greater delta values and need not be investigated further. This reduces the communication traffic and analysis by the project manager significantly and allows him to manage by exception. The project manager requests information over the computer network from the critical and near critical activity managers on the incremental cost to improve their delta values by improving the availability of their critical external elements. Upon receiving it over the computer network, the project manager will balance the additional costs against the benefit/penalty of finishing early /late and authorize additional expenditures accordingly. The delta value at which this tradeoff balances is determined by the project manager, and it becomes the Project Activity Target (PAT) value and it is communicated to all activity managers via the computer network. Each activity manager is responsible for insuring that his activity has a delta value less that or equal to the PAT throughout the project. The project manager may impose a cost threshold, for an activity manager maintaining his activity's delta value, above which, the activity manager must contact the project manager for authorization. This acts a filter that allows small additional costs but allows the project manager to reevaluate the situation in the face of a large additional cost. If availability dates are revised on an external element, they are reported to the activity manager. He needs only to update his Table 1 on his secondary computer, recalculate the delta value, and see if the new delta value is greater than the prior acceptable dominate value for his activity. If it is not, he needs to do nothing. If it is greater, but less that the PAT, he needs to only report it to the project manager via the computer network. If it exceeds the PAT, he needs to determine the cost required to return its delta to be equal to the PAT. If this is below the additional cost threshold, he can spend the money. Otherwise, he must contact the project manager for authorization.

The activity manager for an activity for one project may also be the activity manager for another activity in the same project and/or the activity manager for another activity for another project. This is the case for a functional manager providing engineering, fabrication, or assembly for several projects. Now he has a tool to prioritize his work and resources. He can estimate the beginning and the completion of each activity and calculate its delta value with respect to the activity's baseline schedule date. He needs only to compare these delta values to the project's PAT to determine if the activity is impacting the final completion date. Since each project manager is monitoring his project and reflecting its status in his PAT, the activity manager has an up-to-the-minute status measurement. Now, he can prioritize his resources to not exceed each project's PAT or raise an early warning if it cannot be done without additional costs. He can also look at his resource loadings on a time line. Each activity must begin and end no later than its baseline schedule date plus the PAT. This gives him an actual date for these events. He can determine the possibility of starting an activity early by checking the delta values to avoid a conflict in resource usage. He can consider a more complex pattern of usage of resources since he is typically the expert in these resources. There are numerous ways of depicting this information graphically on the display screen of a secondary computer.

The second portion of the control system monitors the internal operations that occur in the activity network. The activity manager reports to the project manager when his activity begins in terms of the delta value. He also estimates the completion of the activity in terms of the delta value. He reports it actual completion when it occurs in terms of its delta value. Of course, all of the delta values are referenced to the appropriate baseline schedule date in the normal manner. The project manager can accumulate this information and manage it by exception by looking for the largest delta value or any delta value predictions that exceed his PAT. If an activity delta exceeds or is predicted to exceed the PAT, the project manager can investigate the cost to recover the lost time and then determine if the additional costs are justified. If the additional costs are not justified, he can accept the delay and increase the PAT to be commensurate with it. Conversely, if the activity completions are ahead of schedule, he can decrease the PAT to realize this gain. This management technique of using delta values applies additional resources only as needed to be beneficial to the completion date.

Figure 3:
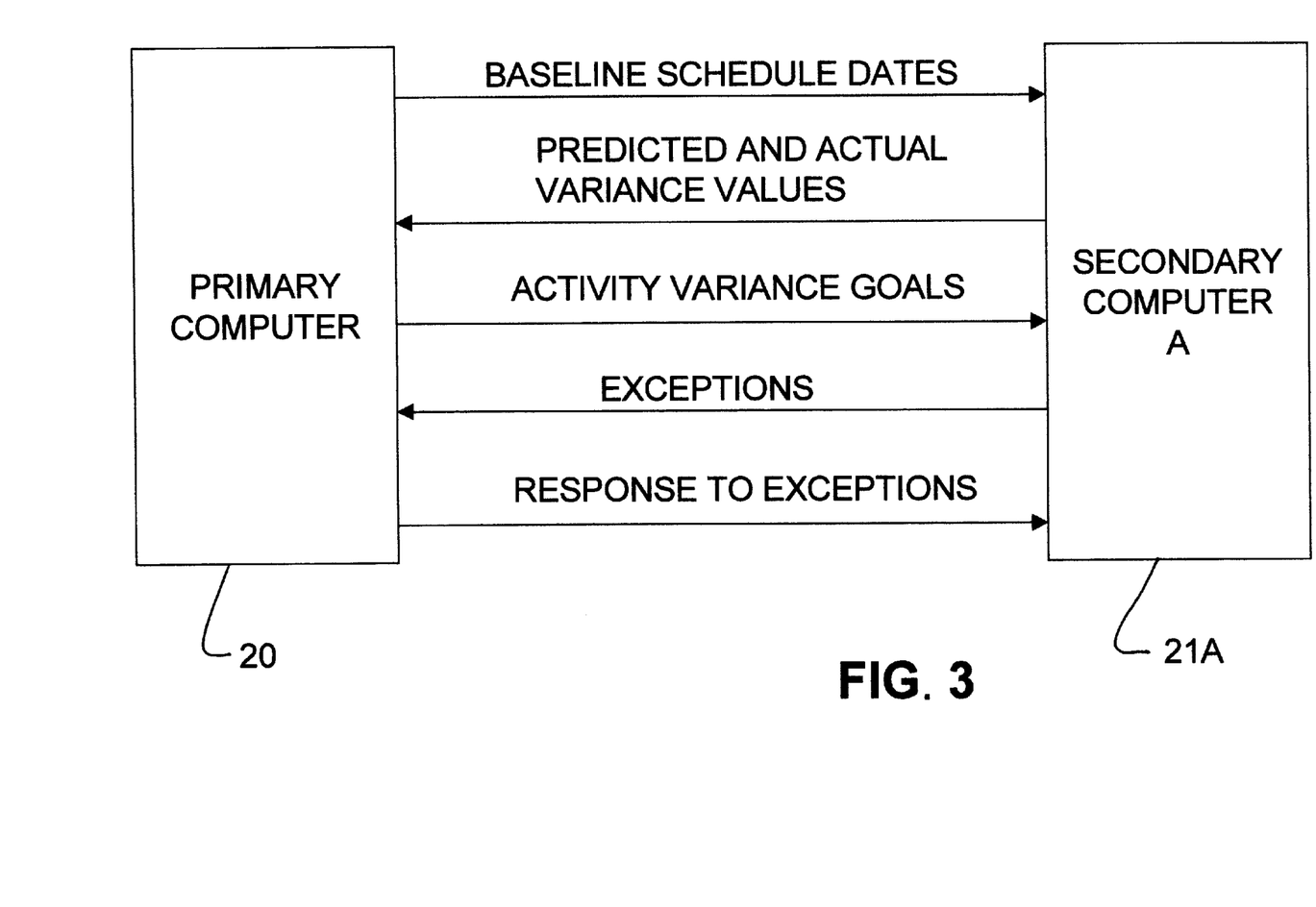
FIG. 3 shows the information flow between the primary computer of the project manager and one secondary computer of an activity manager.

FIG. 3 shows the information flow between the project manager's primary computer 20 and one of the secondary computers 21A belonging to an activity manager. The baseline schedule information goes from the primary computer to the secondary computer. Predicted and actual delta values go from the secondary computer to the primary computer. The Project Activity Target (PAT) values go from the primary computer to the secondary computer. Exceptions that violate the PAT or cost thresholds go from the secondary computer to the primary computer, and responses to the exceptions go from the primary computer to the secondary computer. All of the described information flow can be via the computer network.

Figure 4:
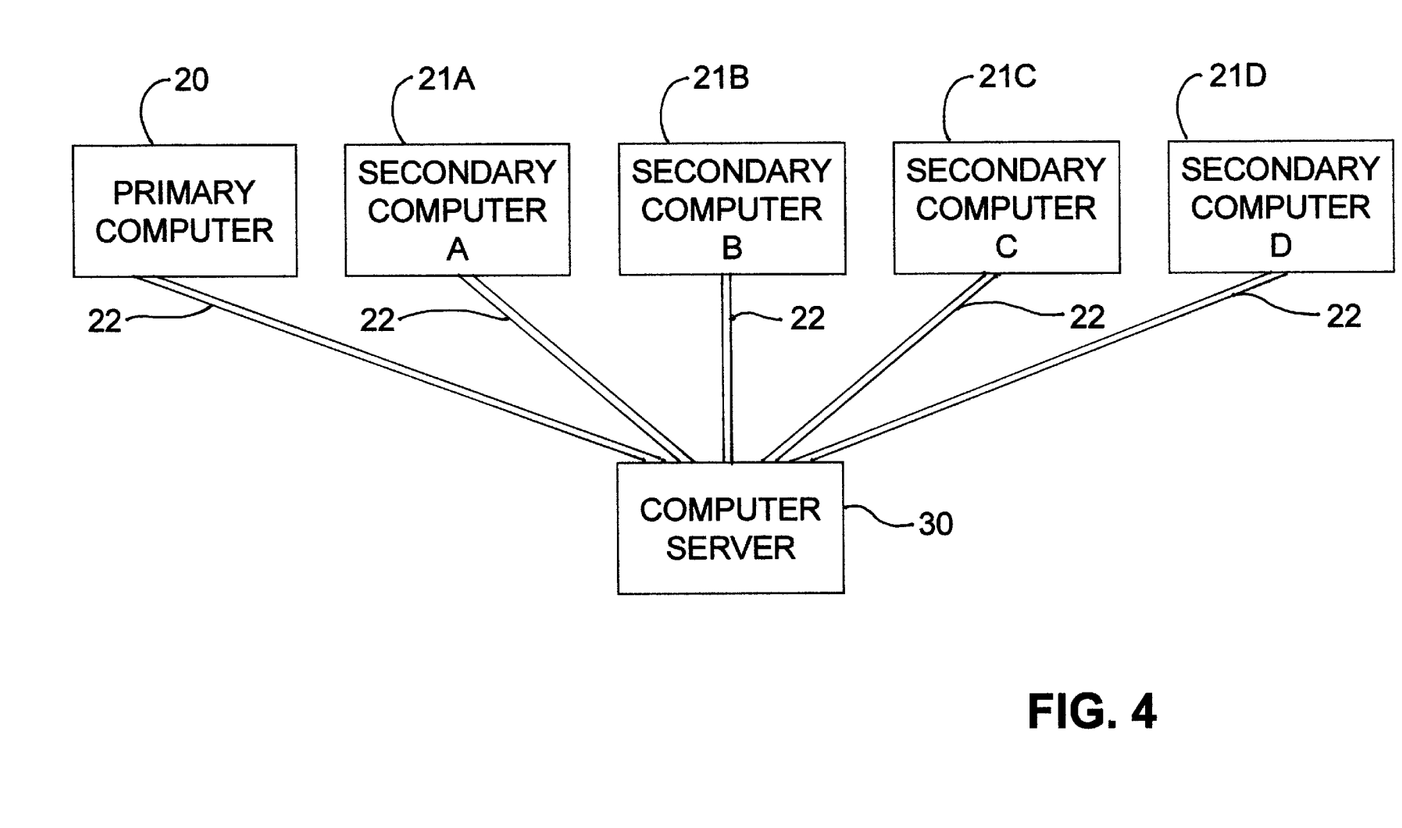
FIG. 4 shows a connection diagram of the system using a client/server computer network arrangement.

FIG. 4 shows an alternative embodiment of the control system. The information is communicated to and stored by a computer network server 30. The primary computer 20 and the secondary computers 21 are clients of the computer network server in a client/server computer network. The primary computer 20 and secondary computers 21 may be standard desktop personal computers that are well known in the art. The computer network server 30 is a digital computer usually with larger speed and storage capacity than the primary computer or secondary computers and is also well known in the art and is offered by a number of manufacturers. The project manager is assigned the primary computer 20 into which he enters the activities, their time sequence interdependencies, and the desired completion date in the same manner as previously described. In the same manner as previously described, the primary computer 20 calculates the baseline schedule dates. The resulting network, events, activities, and baseline schedule dates are communicated through interconnecting cable 22 to the computer network server 30. The computer network server 30 stores this information at a known location in its storage media. An activity manager's secondary computer 21 may request this information from the computer network server 30 through the interconnecting cable 22. The computer network server 30 responds by transmitting the baseline schedule dates to the requesting secondary computer 21 through the interconnecting cable 22. The interconnecting cable may be coaxial cable, fiber optic cable, broadcast signal, the Internet, or the like, also it may contain other hardware elements. The interconnecting cable shown is a descriptive example and should not be construed as limiting. An activity manager's secondary computer 21 receives the activity manager's inputs as previously described and the baseline schedule dates from the computer network server 30 to create the example display represented by Table 1. The activity manager's secondary computer 21 communicates the activity's delta value to the computer network server 30 which stores them and/or transmits them to the project manager's primary computer 20 for the creation of the example display represented by Table 2. Similarly, the project manager's primary computer 20 will communicate the PAT via the computer network server 30 and interconnecting cabling to all the secondary computers 21.

The information flow for the client/server computer network shown in FIG. 4 is essentially the same as in FIG. 3 but each flow path between the primary computer 20 and the secondary computers 21 is routed through the computer network server 30 where the information is also stored.

Another embodiment uses a central computer connected by a computer network to terminals (displays and keyboard) having little or no computing power. The project manager's primary computer would become the primary terminal in this embodiment for the previously described input data and the calculations and information storage would be performed in the central computer. The baseline schedule dates would be communicated to the activity managers' secondary terminals. The activity managers would perform the same functions on their secondary terminals, only the calculations and information storage would be performed by the central computer. The operational interfaces between the project manager and the activity managers with their terminals would be the same as previously described. The benefits of the control system as in the previous embodiments would be realized since the central computer would be operating independently to serve the needs of each user.

Other embodiments of the invention will be apparent to those skilled in the art from a consideration of the specification or practice of the invention disclosed herein. It is intended that the specification and examples are exemplary only and the true scope and spirit of the invention being indicated by the following claims.

TABLE 1

| 1<br>EXTERNAL<br>ELEMENT<br>NUMBER | 2<br>EVENT<br>NUMBER | 3<br>BASELINE<br>SCHEDULE<br>DATE | 4<br>AVAILABILITY<br>DATE<br>ESTIMATE | 5<br>EXTERNAL<br>ELEMENT<br>DELTA |
|---|---|---|---|---|
| 91001 | E2 | 206 | 207 | +1 |
| 91002 | E2 | 206 | 205 | −1 |
| 91003 | E2 | 206 | 204 | −2 |
| 91004 | E2 | 206 | 203 | −3 |
| 91005 | E2 | 206 | 208 | +2 |
| 91006 | E2 | 206 | 205 | −1 |
| 91007 | E2 | 206 | 206 | 0 |

TABLE 1-continued

| 1<br>EXTERNAL<br>ELEMENT<br>NUMBER | 2<br>EVENT<br>NUMBER | 3<br>BASELINE<br>SCHEDULE<br>DATE | 4<br>AVAILABILITY<br>DATE<br>ESTIMATE | 5<br>EXTERNAL<br>ELEMENT<br>DELTA |
|---|---|---|---|---|
| 91008 | E2 | 206 | 204 | −2 |
| 91009 | E2 | 206 | 201 | −5 |
| 91010 | E2 | 206 | 202 | −4 |

TABLE 2

| 1<br>ACTIVITY | 2<br>STARTING<br>EVENT | 3<br>BASELINE<br>SCHEDULE<br>DATE | 4<br>PREDICTED<br>DELTA |
|---|---|---|---|
| A1 | E1 | 204 | −2 |
| A2 | E2 | 206 | +2 |
| A3 | E4 | 203 | −2 |
| A4 | E5 | 206 | −1 |
| A5 | E3 | 209 | 0 |

I claim:

1. A system for the control of the production of a product, comprising:

a primary computer, said primary computer accepting the following inputs: a list of activities in said production, interdependencies of the time sequence of said activities, time duration estimates of said activities, and a desired completion date of said production, said primary computer calculating a baseline schedule date for the start of each said activity, said baseline schedule date for the start of each activity being calculated by subtracting the duration of said activity from the baseline schedule date for the start of the following activity, said desired completion date being the last baseline schedule date, said primary computer storing said baseline schedule dates, said primary computer communicating a baseline schedule date to a secondary computer, said secondary computer accepting the following inputs: designations of external elements required to start an activity and an availability date for each of said external elements, said secondary computer calculating a delta value for each of said external elements, said delta value being equal to the amount of lateness of said availability date with respect to said baseline schedule date for said activity, and said secondary computer identifying the external element having the largest delta value for said activity, said secondary computer communicating the largest external element delta value for said activity to said primary computer, connecting means for communicating between said primary computer and said secondary computer.

2. A system for the control of the production of a product as recited in claim 1, further comprising allocation means for redistributing resources to said external element having the greatest delta value thereby representing the greatest amount of lateness.

3. A system for the control of the production of a product as recited in claim 1, further comprising said production of a product, said production process applying resources to transform an article from an initial state into a different state.

4. A system for the control of the production of a product as recited in claim 1, wherein said primary computer determines a largest delta value for all said activities and and displays said largest delta value for all said activities.

5. A system for the control of the production of a product as recited in claim 1, wherein said secondary computer compares updated revisions of delta values of said external elements for said activity to a project activity target value received from said primary computer, and said secondary computer displays updated revisions of delta values that exceed said project activity target value.

6. A system for the control of the production of a product as recited in claim 1, wherein said secondary computer accepts as input an actual date of completion of an activity, said secondary computer calculates a delta value for said actual completion, said delta value being equal to the degree of lateness of said actual completion date with respect to said baseline schedule date for said completion of said activity, said secondary computer communicating said delta value to said primary computer using connecting means for communicating.

7. A system for the control of the production of a product, comprising:

a primary computer, said primary computer accepting the following inputs: a list of activities in said production, interdependencies of the time sequence of said activities, time duration estimates of said activities, and a desired completion date of said process, said primary computer calculating a baseline schedule date for the start of each said activity, said baseline schedule date for the start of each activity being calculated by subtracting the duration of said activity from the baseline schedule date for the start of the following activity, said desired completion date being the last baseline schedule date, said primary computer transmitting said baseline schedule dates to a computer network server for storage, a secondary computer, said secondary computer accepting the following inputs: designations of external elements required to start an activity and an availability date for each of said external elements, said secondary computer retrieving the baseline schedule date for said activity from said computer network server, said secondary computer calculating a delta value for each of said external elements, said delta value being equal to the amount of lateness of said availability date with respect to said baseline schedule date for said activity, and said secondary computer identifying the external element having the largest delta value for said activity said secondary computer communicating the largest external element delta value for said activity to said computer network server, said computer network server receiving data from said primary computer and from said secondary computer, and providing storage locations for said data means for interconnecting said primary computer, said secondary computer, and said computer network server, said means for interconnecting being capable of communicating computer-readable data signals.

8. A method for the control of a project, comprising:

entering into a primary computer the following inputs: a list of activities in said project, interdependencies of the time sequence of said activities, time duration estimates of said activities, and a desired completion date, calculating in said primary computer a baseline schedule date for the start of each said activity, said baseline schedule date for the start of each activity being equal to the baseline schedule date for the start of the following activity minus said estimated time duration of said activity, said desired completion date being the last baseline schedule date in said network, communicating said baseline schedule date to a secondary computer, entering into said secondary computer the following inputs: designations of external elements required to start an activity and the availability date for each of said external elements, calculating, in said secondary computer, a delta value for each of said external elements, said delta value being equal to the amount of lateness of said availability date with respect to said baseline schedule date for said activity, determining in said secondary computer the most late delta value, communicating said most late delta value from said secondary computer to said primary computer, storing in said primary computer said most late delta value received from said secondary computer.

9. A method for the control of a project as recited in claim 8, further comprising:

redistributing resources to said external elements having the most late delta values, producing a product by applying resources to transform an article from an initial state to a different state.

10. A method for the control of a project as recited in claim 8, further comprising:

determining by said primary computer a most late delta value for all activities, communicating a project activity target value for all activities from said primary computer to said secondary computer.

11. A method for the control of a project as recited in claim 10, further comprising:

comparing by said secondary computer of updated revisions of delta values of said external elements for said activity to said project activity target value for all said activities received from said primary computer, displaying by said secondary computer all updated revisions to delta values that are more late than said project activity target value for all said activities.

12. A method for the operation of a project control primary computer, comprising:

entering into said project control primary computer the following inputs: a list of activities in said project, interdependencies of the time sequence of said activities, time duration estimates of said activities, and a desired completion date, calculating in said project control primary computer a baseline schedule date for the start of each said activity, said baseline schedule date for the start of each activity being equal to the baseline schedule date for the start of the following activity minus said estimated time duration of said activity, said desired completion date being the last baseline schedule date in said project, storing said baseline schedule dates, transmitting said baseline schedule date to a plurality of secondary computers, receiving from said secondary computers a most late delta value for each activity, storing in said project control primary computer said most late delta values for each activity received from said secondary computers, determining the latest delta value from amongst all most late delta values received from said secondary computers and displaying said latest delta value.

13. A method for the operation of a project control primary computer as recited in claim 12, further comprising:

transmitting a project activity target value for all activities to said secondary computers.

14. A method for the operation of a secondary computer, comprising:

entering into and storing in said secondary computer the following inputs: designations of external elements required to start an activity, the availability date for each of said external elements, and a baseline schedule date for the start of said activity, calculating, in said secondary computer, a delta value for each of said external elements, said delta value being equal to the amount of lateness of said availability date with respect to said baseline schedule date for said activity, determining and storing in said secondary computer the most late delta value for said activity, displaying said most late delta value for said activity.

15. A method for the operation of a secondary computer as recited in claim 14, further comprising:

transmitting said most late delta value for said activity from said secondary computer to a project control primary computer.

16. A method for the operation of a secondary computer as recited in claim 4, further comprising:

receiving from a project control primary computer a project activity target value for all activities, storing in said secondary computer said project activity target value for all activities received from said primary computer, identifying and displaying said external elements having delta values more late than said project activity target value.

17. A secondary computer, comprising:

means for entering into and storing in said secondary computer the following inputs: designations of external elements required to start an activity, the availability date for each of said external elements, and a baseline schedule date for the start of said activity, means for calculating, in said secondary computer, a delta value for each of said external elements, said delta value being equal to the amount of lateness of said availability date with respect to said baseline schedule date for said activity, means for determining and storing in said secondary computer the most late delta value, means for displaying said most late delta value.

18. A secondary computer, comprising:

means for receiving a computer readable data signal containing a baseline schedule date for the start of an activity in a network of activities, said baseline schedule date for the start of each activity being equal to the baseline schedule date for the start of the following activity minus an estimated time duration of said activity, a desired completion date being the last baseline schedule date in said network, means for storing said baseline schedule date, means for entering a selection of said activity into said secondary computer, means for displaying said baseline schedule date in response to said selection.

19. A secondary computer as recited in claim 18, wherein computer readable data signal is a broadcast signal.

20. A secondary computer as recited in claim 18, wherein said means for receiving also receives a computer readable data signal containing a project activity target value for all activities, and said means for displaying also displays said project activity target value.

21. A secondary computer as recited in claim 18, wherein said secondary computer is sufficiently small so as to be held in one human hand and operated while held in said human hand.

22. A method for the operation of a computer network server, comprising:

receiving from a primary computer a baseline schedule date for the start of each activity in a network of activities, said baseline schedule date for the start of each activity being equal to the baseline schedule date for the start of the following activity minus an estimated time duration for said activity, a desired completion date being the last baseline schedule date in said network, storing said baseline schedule dates, transmitting a baseline schedule date for an activity to a secondary computer, receiving from said secondary computer a most late delta value for said activity, storing most late delta value for said activity, transmitting said most late delta value to said primary computer.

23. A method for the operation of a computer network server as recited in claim 22, further comprising:

receiving a project activity target value for all activities from said primary computer, storing said project activity target value, transmitting said project activity target value to said secondary computer.

24. A program storage device readable by a computer network server, embodying a program of instructions executable by said computer network server to perform method steps, comprising:

receiving from a primary computer a baseline schedule date for the start of each activity in a network of activities, said baseline schedule date for the start of each activity being equal to the baseline schedule date for the start of the following activity minus an estimated time duration for said activity, a desired completion date being the last baseline schedule date in said network, storing said baseline schedule dates, transmitting a baseline schedule date for an activity to a secondary computer, receiving from said secondary computer a most late delta value for said activity, storing most late delta value for said activity, transmitting said most late delta value to said primary computer.

25. A program storage device readable by a computer network server as recited in claim 24, embodying a program of instructions executable by said computer network server to perform method steps, further comprising:

receiving a project activity target value for all activities from said primary computer, storing said project activity target value, transmitting said project activity target value to said secondary computer.

26. A program storage device readable by a primary computer, embodying a program of instructions executable by said primary computer to perform method steps, comprising:

receiving into and storing in said primary computer the following inputs: a list of activities in a network, interdependencies of the time sequence of said activities, time duration estimates of said activities, and a desired completion date, calculating in said primary computer a baseline schedule date for the start of each said activity, said baseline schedule date for the start of each activity being equal to the baseline schedule date for the start of the following activity minus said estimated time duration of said activity, said desired completion date being the last baseline schedule date in said network, storing in said primary computer said baseline schedule dates, transmitting from said primary computer said baseline schedule dates to a plurality of secondary computers, receiving from said secondary computers a most late delta value for an activity, storing in said primary computer said most late delta values received from said secondary computers, determining in said primary computer the latest delta value from amongst all most late delta values received from said secondary computers and displaying said latest delta value.

27. A program storage device readable by a primary computer as recited in claim 26, embodying a program of instructions executable by said primary computer to perform method steps, further comprising:

receiving into and storing in said primary computer a project activity target value for all activities, transmitting from said primary computer said project activity target value to said secondary computers.

28. A program storage device readable by a secondary computer, embodying a program of instructions executable by said secondary computer to perform method steps, comprising:

entering into and storing in said secondary computer the following inputs: designations of external elements required to start an activity, the availability date for each of said external elements, and a baseline schedule date for the start of said activity, calculating, in said secondary computer, a delta value for each of said external elements, said delta value being equal to the amount of lateness of said availability date with respect to said baseline schedule date for said activity, determining and storing in said secondary computer the most late delta value, displaying said most late delta value.

29. A computer program product for use in a graphics display device, said graphics display device being a part of a secondary computer, said computer program product, comprising:

a computer useable medium having computer readable program code means embodied in said medium, computer readable program code means for displaying a tabular matrix of information on said graphical display device, said tabular matrix having four columns and a plurality of rows, a first column having designators of external elements, a second column having a baseline schedule date for the start of an activity requiring said external elements, a third column having the availability date for each of said external elements, and a fourth column having the amount of lateness of each of said availability dates with respect to said baseline schedule date, computer readable program code means for accepting as input said designators of external elements, said baseline schedule date, and said availability dates, computer readable program code means for calculating said amount of lateness of each said availability date with respect to said baseline schedule date.

* * * * *